United States Patent [19] [11] 4,445,412
Peters [45] May 1, 1984

[54] IMPROVED TABLE SAW ARRANGEMENT

[76] Inventor: Jerry M. Peters, P.O. Box 23692, San Jose, Calif. 95123

[21] Appl. No.: 398,974

[22] Filed: Jul. 16, 1982

[51] Int. Cl.³ .............................. B27B 5/29; B27C 9/04
[52] U.S. Cl. ..................................... 83/477.2; 83/574; 83/545; 144/134 D; 144/251 R
[58] Field of Search ..................... 83/477, 477.1, 477.2, 83/478, 545, 546, 574, 648, 859, 860; 144/1 C, 1 E, 1 F, 134 D, 136 C, 251 R, 251 A, 286 R, 286 A, 287

[56] References Cited

U.S. PATENT DOCUMENTS

| | | | |
|---|---|---|---|
| 2,501,134 | 3/1950 | Mackoski et al. | 144/1 C |
| 3,734,151 | 5/1973 | Skripsky | 144/286 R |
| 4,186,784 | 2/1980 | Stone | 83/574 X |
| 4,265,283 | 5/1981 | Nash | 144/286 A |

Primary Examiner—James M. Meister
Attorney, Agent, or Firm—Fliesler, Dubb, Meyer & Lovejoy

[57] ABSTRACT

An improvement is set out in a table saw arrangement (10) which includes a generally vertically oriented generally circular rotatable saw blade (12) extending upwardly through a slot (14) in a work table (16), which work table has a fence (24) generally parallel to the slot (14), which fence is adjustably positionable on the table in parallel relationship to the slot (14). A leaf (36) is attachable against an edge (18) of the table (16) which is parallel to the slot (14). The leaf (36) has an opening (40) and a skirt defined by peripheral portions (44,46,48 and 50). One edge of the leaf (36) can be fastened against the edge (18) of the work table (16). An adapter plate (76) is mountable beneath the leaf (36) and is also mountable to any of a number of power tools. The adaptor plate (76) is also mountable via spacers to the leaf (36). The plate (76) has a central opening (78) to allow the bit, saw blade, or the like, of a power tool to extend upwardly therethrough and through the opening (40) on the leaf (36). The overall arrangement (10) is inexpensive and takes up relatively little space while providing a valuable woodworking surface.

10 Claims, 2 Drawing Figures

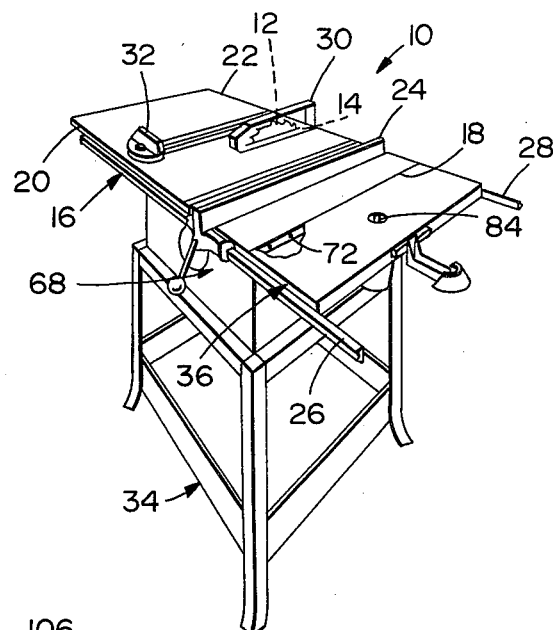
FIG. 1
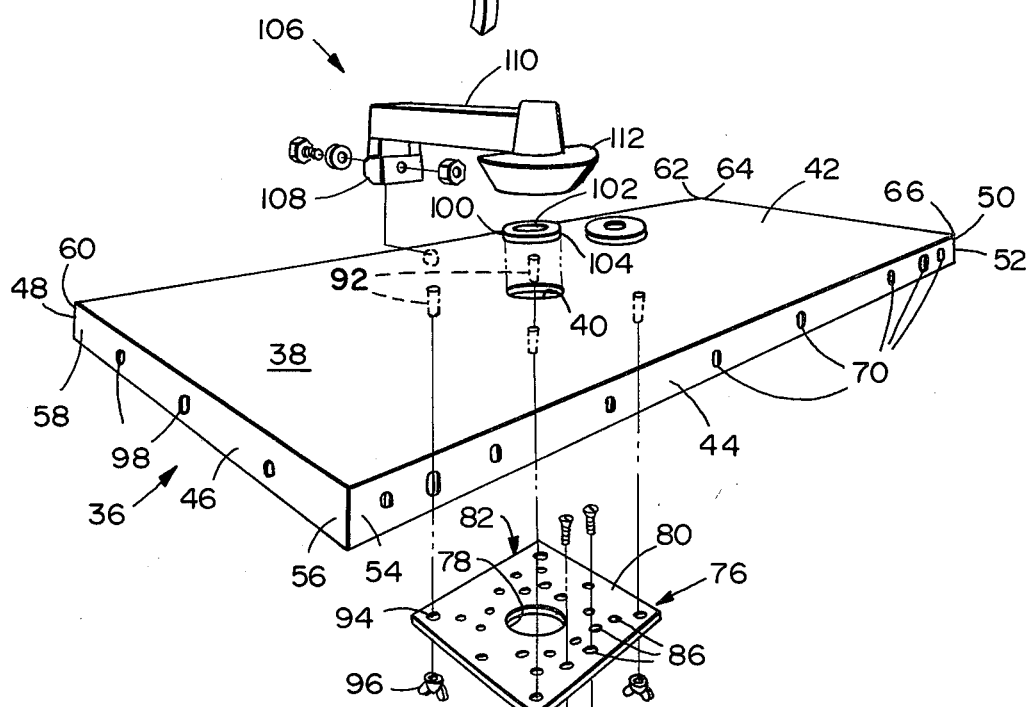
FIG. 2
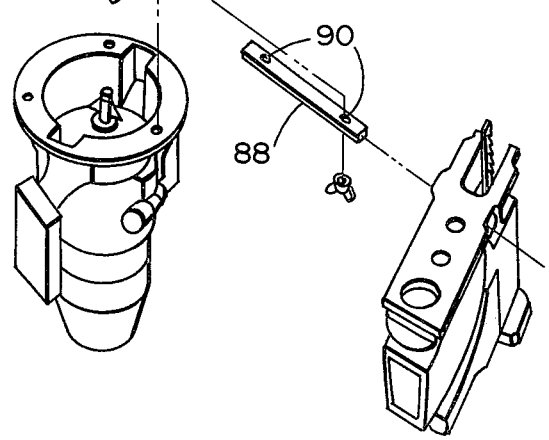

IMPROVED TABLE SAW ARRANGEMENT

DESCRIPTION

1. Technical Field

This invention relates generally to an improved table saw arrangement which includes a leaf which is mountable to a work table which includes a generally vertically oriented rotatable saw blade extending upwardly through a slot in the table. The overall arrangement allows various other work tools to be used with the guides and the like normally used to guide material relative to the saw blade.

2. Background Art

Generally, such peripheral tools as sabre saws, routers and the like, have not been readily mountable to the work tables which form a part of an overall table saw arrangement. As a result, separate tables or stands have had to be fabricated to mount such power tools. This created significant added expense, not only because of the cost of the additional table itself, but also because of duplication of guides, guard covers, and the like.

The present invention is directed to overcoming one or more of the problems as set forth above.

DISCLOSURE OF INVENTION

In accordance with an aspect of the present invention, an improved table saw arrangement is disclosed. The improvement is in a table saw arrangement which includes a generally vertically oriented generally circular rotatable saw blade which extends upwardly through a slot in a work table. The work table has an edge portion generally parallel to the slot and a fence selectively positionable on the table in parallel relation to the slot between the slot and the edge portion. The fence is slidably mounted on a pair of rails, each of which is mounted to a different one of a pair of side edge portions of the table. The improvement comprises a rigid rectangular member having a generally planar portion having a generally centrally located member opening through it. The rigid rectangular member includes first, second, third and fourth peripheral portions with the first and third peripheral portions and the second and fourth peripheral portions being respectively generally parallel to one another. The peripheral portions extend generally orthogonally downwardly from the planar portion and have respective edges which are affixed together. Means is provided for fastening the first peripheral portion in adjacent fixed relation to the edge portion of the work table. A rigid generally planar adaptor plate of smaller dimensions than the rectangular member is provided, the adaptor plate having a generally centrally located plate opening. Means is provided for mounting the adaptor plate to any one of a variety of power tools having an extending working member, the plate opening being adapted to unobstructingly pass the extending work member when one of the tools is mounted to the adaptor plate. A plurality of fastener-spacers are attached between the planar portion of the rectangular member and the adaptor plate and are adapted to fasten the adaptor plate in rigid generally parallel relation to the planar portion of the rectangular member a spaced distance below the planar portion with the member opening generally coaxially aligned with the plate opening and the plate opening being adapted to unobstructingly pass the extending work member.

An improved table saw arrangement as set out above provides the advantage of allowing a single table to be used for not only a circular rotating table saw, but also for a router, a drill, a sabre saw, or the like. This saves space as well as money. Furthermore, the fence and other guide members which are present on the original table saw arrangement can likewise be used with the router, the sabre saw, or the like. Still further, the circular table saw itself can be used without disassembling the overall arrangement since it is only necessary to lower the router bit or move the blade of the sabre saw in order to keep these members out of the way.

BRIEF DESCRIPTION OF DRAWINGS

FIG. 1 illustrates, in perspective, a table saw arrangement in accordance with the present invention;

FIG. 2 illustrates, in exploded perspective, a leaf which is mountable to a conventional table saw arrangement to form the improved table saw arrangement of the present invention.

BEST MODE FOR CARRYING OUT THE INVENTION

Adverting to FIG. 1, a table saw arrangement 10 is illustrated which includes a generally vertically oriented generally circular rotatable saw blade 12 extending upwardly through a slot 14 in a work table 16. The work table 16 has an edge portion 18 generally parallel to the slot 14 and a pair of parallel side edge portions 20 and 22 generally orthogonal to the first-mentioned edge portion 18. A fence 24 is selectively positionable on the table 16 in parallel relation to the slot 14 between the slot 14 and the edge portion 18. The fence 24 is slidably mounted to a pair of rails 26, 28, each of which is mounted to a different one of the pair of side edge portions 20 and 22. Saw blade guard 30, of a conventional nature, also forms a part of the table saw arrangement as does a guide 32. Conventional frame members 34 serve to hold the table 16 a desired height above floor level.

In accordance with the present invention, a rigid rectangular member 36 is provided, seen in more detail in FIG. 2. The rigid rectangular member 36 has a generally planar portion 38 having a generally centrally located member opening 40 going through the planar portion 38 from its top surface 42 to its bottom surface (not shown). The rigid rectangular member 36 also includes first 44, second 46, third 48, and fourth 50 peripheral portions with the first peripheral portion 44 and the third peripheral portion 48 being generally parallel to one another and with the second peripheral portion 46 and the fourth peripheral portion 50 being generally parallel to one another. The peripheral portions 44, 46, 48 and 50 extend generally orthogonally downwardly from the planar portion 38 and each of the peripheral portions 44, 46, 48 and 50 have respective edges 52, 54, 56, 58, 60, 62, 64 and 66, adjacent of which are affixed together as by welding or the like. The joints between the respective edges are made smooth to minimize the possibility of injury. They are also made strong to assure an overall rigidity for the rigid rectangular member 36.

In accordance with the invention, means 68 is provided for fastening the first peripheral portion 44 in adjacent fixed relation to the edge portion 18 of the work table 16. In the particularl embodiment illustrated, the fastening means 68 includes a first plurality of holes 70 in the first peripheral portion 44, a second plurality of holes 72 in the edge portion 18 of the work table 16 and bolt members 74 passing through aligned ones of the first plurality of holes 70 and the second plurality of holes 72. In the preferred embodiment of the invention, the first plurality of holes 70 includes sufficient numbers of holes and such holes are so located as to be alignable with at least two distinctive geometries of the second plurality of holes 72. Thus, the rigid rectangular member 36 can be attached to work tables 16 having at least two different geometries of holes 72. This allows for attachment to work tables 16 made by different manufacturers.

A rigid generally planar adaptor plate 76, as illustrated in FIG. 2, is also part of the present invention. Adaptor plate 76 is of smaller dimensions than the rectangular member 36 and has a generally centrally located plate opening 78 which passes through it from its top surface 80 to its bottom surface (not shown).

Means 82 is provided for mounting the adaptor plate 76 to any one of a variety of power tools (not illustrated) which have an extending working member 84 (FIG. 1). The plate opening 78 is adapted to unobstructingly pass the extending working member 84 when a power tool is mounted to the adaptor plate 76. The mounting means 82 would generally include a plurality of holes 86 which pass through the adaptor plate 76 from its top surface 80 to its bottom surface. The holes 86 are so positioned as to be alignable with corresponding holes on the power tools and it is desirable to provide sufficient holes and in sufficient patterns to match any of the great variety of small power tools available on the market. It is possible to provide replacement adaptor plates 76 specially designed for use with power tools which have particularly strange geometries, or to tap additional holes 86 into the adaptor plate 76 so it will match any particular power tool mounting flange. For power tools which do not include a mounting flange, such as a number of sabre saws, it may be desirable to utilize a bar 88 which is engageable to hold the power tool and which has appropriate holes 90 through it, which holes 90 match up with at least two of the holes 86. This allows a sabre saw or the like to be held tightly against the adaptor plate 76.

A plurality of fastener-spacers are attached between the planar portion 38 of the rectangular member 36 and the adaptor plate 76. The fastener-spacers 92 are adapted to fasten the adaptor plate 76 in rigid generally parallel relation to the planar portion 38 of the rectangular member 36 a spaced distance below the planar portion 38 with the member opening 40 of the rectangular member 36 generally coaxially aligned with the plate opening 78 of the adaptor plate 76. The plate opening 78, like the member opening 40, is adapted to unobstructingly pass the extending work member 84. In the particular embodiment illustrated, the fastener-spacers 92 include four posts which are externally threaded along a portion of their lengths and which pass a limited distance through post holes 94 in the planar adaptor plate 76 and corresponding wing nuts 96 which thread upon the posts 92. This allows the adaptor plate 76 to be easily and quickly hand removed by an operator. For convenience, it may be desirable to have a plurality of adaptor plates 76 and leave them attached to the individual power tools. The wing nuts 96 serve to releasably fasten the adaptor plate 76 to the rectangular member 36.

In accordance with the present invention, the rails 26 and 28 which are mounted to and extend respectively along the pair of side edge portion 20 and 22 of the work table 16 are made of sufficient length to extend along and be further mounted to the second peripheral portion 46 and the fourth peripheral portion 50 of the rectangular member 36. This allows the fence 24 to be used to position work pieces relative to the member opening 40 in the rectangular member 36. This provides great convenience and saves money for the user. Appropriate holes 98 in the second peripheral portion 46 and corresponding holes (not shown) in the fourth peripheral portion 50 provide means for bolting the respective rails 26 and 28 to the rectangular member 36.

It is preferable to provide at least one circular insert 100 and more preferably a plurality of such inserts 100 which have central openings 102 therethrough and have outer peripheries 104 which are adapted to be held in the member opening 40 in the rectangular member 36. The circular inserts 100 are used to limit the amount of debris which can fall through the member opening 40 past the working member 84 and onto the power tools. It is preferable to have a plurality of the circular inserts 100, since different power tools have different sized working members and with a plurality of circular inserts, each having somewhat different sized central insert openings 102, the amount of debris which can fall through the member opening 40 can be limited to a minimal quantity while allowing full freedom of use of the power tool through access to the working member 84.

In accordance with the present invention, it is also possible to utilize a guard structure 106. The guard structure 106 includes a bracket 108 which is attachable to the third peripheral portion 48 of the rectangular member 36. Lever member 110 is pivotally mounted to the bracket 108 and includes a guard portion 112 which is positionable to cover the working member 84. Generally, the drive member 112 would simply ride up on the top of the piece being worked upon, such as a board being sawed or routed, thereby providing protection for the worker.

INDUSTRIAL APPLICABILITY

An improved table saw arrangement 10 in accordance with the present invention is useful for the mounting of sabre saws, routers, and the like, for use by a woodworking hobbyist. The rigid rectangular member 36 is relatively inexpensive and is generally made adaptable to fasten to any of a number of manufacturer's work tables 16. Attachment of the rectangular member 36 to a conventional work table 16 provides significant added working space without taking up a great deal of extra floor space. The fence 24 and other guidance members present on a conventional work table 16 can generally utilized to position work pieces realtive to the working member 84 of a power tool such as a sabre saw or a router. Easy removal and replacement of the power tools is another important feature of the improved table saw arrangement.

Other aspects, objectives, and advantages of this invention can be obtained from a study of the drawing, the disclosure and the appended claims.

I claim:

1. In a table saw arrangement (10) which includes a generally vertically oriented generally circular rotatable saw blade (12) extending upwardly through a slot (14) in a work table (16) having an edge portion (18) generally parallel to the slot (16), a pair of parallel side edge portions (20,22) generally orthogonal to the first edge portion (18), and a fence (24) selectively positionable on the table (16) in parallel relation to the slot (14) between the slot (14) and the edge portion (18), the fence (24) being slidably mounted to a pair of rails (26,28) each of which is mounted to a different one of the pair of side edge portions (20,22), an improvement comprising:

a rigid rectangular member (36) having a generally planar portion (38) having a generally centrally located member opening (40) therethrough and first first (44), second (46), third (48) and fourth (50) peripheral portions (44,46,48,50), said first (44) and third (48) peripheral portions (44,48) being generally parallel to one another and said second (46) and fourth (50) peripheral portions (46,50) being generally parallel to one another, said peripheral portions (44,46,48,50) extending generally orthogonally downwardly from said planar portion (38), each of said peripheral portions (44,46,48,50) having edges (52,54,56,58,60,62,64,66), respective adjacent of which are fixed together;

means (68) for fastening said first peripheral portion (44) in adjacent fixed relation to said edge portion (18) of said work table (16);

a rigid generally planar adaptor plate (76) of smaller dimensions than said rectangular member (36), said adaptor plate (76) having a generally centrally located plate opening (78);

means (82) for mounting said adaptor plate (76) to any of a variety of power tools having an extending working member (84), said plate opening (78) being adapted to unobstructingly pass said extending working member (84) when said one of said tools is mounted to said adaptor plate (76); and a plurality of fastener-spacers (92) attached between said planar portion (38) of said rectangular member (36) and said adaptor plate (76) and being adapted to fasten said adaptor plate (76) in rigid generally parallel relation to said planar portion (38) of said rectangular member (36) a spaced distance below said planar portion (38) with said member opening (40) generally coaxially aligned with said plate opening (78), said plate opening (78) being adapted to unobstructingly pass said extending work member (84).

2. An improved table saw arrangement (10) as set forth in claim 1, wherein said fastening means (68) includes a first plurality of holes (70) in said first peripheral portion (44), a second plurality of holes (72) in said edge portion (18) and bolt members (74) passing through aligned ones of said first (70) and second (72) pluralities of holes (70,72) and wherein said plurality of holes (70) is present in sufficient quantity and is so located as to be alignable with at least two distinctly different geometries of said second plurality of holes (72).

3. An improved table saw arrangement (10) as set forth in claim 1, wherein said fastener-spacers (92) are releasably fastened to said adaptor plate (76).

4. An improved table saw arrangement (10) as set forth in claim 1, further including:

at least one circular insert (100) having a central insert opening (102) and having an outer periphery (104) adapted to be held in said member opening (40) to limit the amount of debris which can fall through said member opening (40) past said working member (84) and onto said power tool.

5. An improved table saw arrangement (10) as set forth in claim 1, wherein said rails (26,28) extend along and are further mounted to said second (46) and fourth (50) peripheral portions (46,50) allowing said fence (24) to be used to position work pieces adjacent and relative to said member opening (40).

6. An improved table saw arrangement (10) as set forth in claim 1, further including:

a bracket (108) attachable to said third peripheral portion (40); and a lever member (110) pivotally mounted to said bracket (108) and having a guard portion (112) positionable to cover said working member (84).

7. An improved table saw arrangement (10) as set forth in claim 1 wherein said fastening means (68) includes a first plurality of holes (70) in said first peripheral portion (44), a second plurality of holes (72) in said edge portion (18) and bolt members (74) passing through aligned ones of said first (70) and second (72) pluralities of holes (70,72), said first plurality of holes (70) is present in sufficient quantity and is so located as to be alignable with at least two distinctly different geometries of said second plurality of holes (72), and said rails (26,28) extend along and are further mounted to said second (46) and fourth (50) peripheral portions (46,50) allowing said fence (24) to be used to position work pieces adjacent and relative to said member opening (40).

8. An improved table saw arrangement (10) as set forth in claim 7 further including:

at least one circular insert (100) having a central insert opening (102) and having an outer periphery (104) adapted to be held in said member opening (40) to limit the amount of debris which can fall through said member opening (40) past said working member (84) and onto to said power tool.

9. An improved table saw arrangement (10) as set forth in claim 8, further including:

a bracket (108) attachable to said third peripheral portion (40); and a lever member (110) pivotally mounted to said bracket (108) and having a guard portion (112) positionable to cover said working member (84).

10. An improved table saw arrangement (10) as set forth in claim 9, wherein said fastener-spacers (92) are releasably fastened to said adaptor plate (76).

* * * * *